UNITED STATES PATENT OFFICE

2,563,586

RESINOUS COMPOSITIONS FROM ALKYL MERCAPTO ETHYL ALCOHOLS

Joachim Dazzi, Dayton, Ohio, assignor to Monsanto Chemical Company, St. Louis, Mo., a corporation of Delaware No Drawing. Application October 27, 1948, Serial No. 56,915

8 Claims. (Cl. 260—79)

This invention relates to new polymeric compositions having unusual and valuable properties fully described hereinafter. More specifically the invention relates to polysulfide resins made by the condensation of thiahydrocarbon alcohols.

The purpose of this invention is to provide new polysulfide polymers having unusual properties. A further purpose is to provide a method of preparing new condensation products from thiahydrocarbon alcohols. Still further purposes will be apparent from the following specification and claims.

The new class of polymers may be defined by the following structural formula:

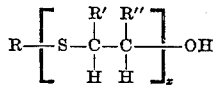

wherein R is a tertiary alkyl radical, or a tertiary aralkyl radical, R' and R" are radicals of the group consisting of hydrogen, methyl, ethyl, phenyl, vinyl radicals, the higher alkyl radicals, especially those having up to eight carbon atoms, and the substituted phenyl radicals, particularly the methyl phenyl, dimethyl phenyl and ethyl phenyl radicals, and $x$ is a small whole number from 4 to 50, indicative of the extent of polymerization.

The new family of polysulfide polymers are prepared by reacting tertiary alkyl mercaptans with an alkylene oxide to produce the tertiary alkylmercaptoalkanol and thereafter treating the product with an acidic catalyst to produce the polyalkylene sulfide. The following equation, showing the condensation of tertiary butyl-mercaptoethanol, is typical of the reaction.

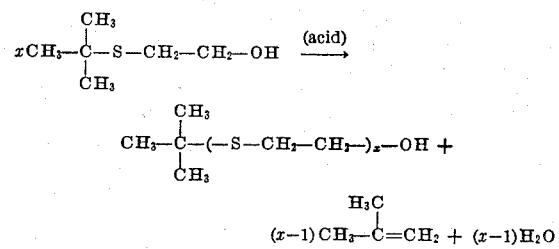

The new compounds are prepared from the readily available branched alkenes, such as isobutylene, isoamylene, and the various isohexylenes, the polymers of these and other isoalkenes, for example diisobutylene (octene) and triisobutylene, and the branched vinyl aromatics, such as α-methyl styrene, isopropenyl toluene and isopropenylbiphenyl, first by reaction with $H_2S$ to form the mercaptan and then by condensation with an alkylene oxide, such as ethylene oxide, propylene oxide, butylene oxide and butadiene oxide. The tertiary alkyl mercaptoalkanols so produced are then heated in the presence of a suitable acid catalyst to form the new condensation products. Suitable acid catalysts are sulfuric acid, para-toluene sulfonic acid, benzene sulfonic acid, alkane sulfonic acid, phosphoric acids, and other similar strong organic and inorganic acids, especially those conventionally used as esterification catalysts. In the preferred practice of this invention from 0.1 percent to 5 percent by weight of the acid catalyst is used.

Where condensation products are prepared from the ethylene oxide adduct and the monomeric low molecular weight alkyl mercaptans the product may be separated as a single pure compound. When higher homologous alkylene oxides are used, for example propylene oxide and butadiene oxide, mixtures of two different addition products are usually secured. Similarly, when the tertiary alkyl mercaptans are prepared from polymeric alkenes, for example diisobutylene, triisobutylene, and diisoamylene, the products are invariably mixtures of the products derived from the several isomeric alkenes. In the use of the products of this invention the mixtures of isomeric compounds are often as effective as the separated pure compounds.

It will be noticed that when the tertiary alkyl mercaptoalkanols are condensed to form the polysulfides most of the isoalkene is regenerated and may be utilized to prepare additional lots of the mercaptans and which may be reacted with additional proportions of the alkylene oxide and condensed to form more of the polysulfide resins.

The new polymeric compositions produce unusual beneficial effects when added to lubricating oils. The compositions show unusual antioxidant and anti-corrosion effects.

Further details of the practice of this invention are set forth with respect to the following specific examples.

Example 1

A glass reaction flask was fitted with a thermometer, a water-cooled reflux condenser and a water separatory trap. The flask was charged with 38 parts by weight of β-octyl-mercaptoethanol and 50 parts of xylene. The contents of the flask was heated to reflux temperature to remove any water present. A small amount of p-toluene sulfonic acid (0.38 part) was added and the mixture refluxed for eleven hours, during which a substantial quantity of water was removed. The reaction mass was heated to 139° C. to remove the volatile components. Upon cooling a solid separated from the residue. A further precipitation of solid was achieved by adding an equal volume of acetone to the residue. The solid polymer so obtained was separated by filtration and the filtrate evaporated to obtain an additional quantity of rather impure polymer. The polymer obtained was identified as the polysulfide having the probable structural formula:

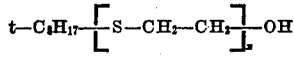

wherein $x$ is a small whole number indicative of the extent of polymerization. (Average $x$ value 8.3.)

*Example 2*

The procedure of Example 1 was repeated except that t-octylmercaptopropanol, prepared by reacting propylene oxide with t-octylmercaptan, was used in place of the t-octylmercaptoethanol. The reflux in the presence of the acid catalyst was conducted for seventy-two hours. The separated products were identified as mixtures of the following two compounds.

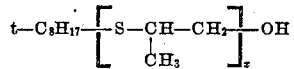

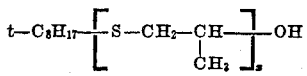

*Example 3*

The procedure of the preceding examples was repeated by refluxing t-butylmercaptoethanol for twenty-four hours in the presence of one percent of para-toluene sulfonic acid. The resulting polymer was identified as that having the following structural formula:

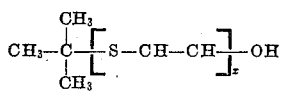

wherein $x$ is a small whole number indicative of the extent of polymerization.

*Example 4*

The procedure of the previous examples was repeated except that the t-alkylmercapto alcohol used was that prepared by reacting butadiene monoxide with t-octylmercaptan. The resulting polymer was a mixture of the following compounds.

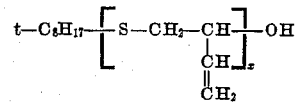

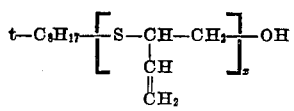

Although the new method preferably involves the use of t-alkyl and t-aralkylmercapto alcohols, secondary alkyl- and secondary aralkylmercapto alcohols may also be used. The reaction, however, is frequently more sluggish, requiring higher temperatures and longer periods of heating to effect the conversion to the polysulfides. Thus a new family of compounds may be prepared, corresponding to the structural formula:

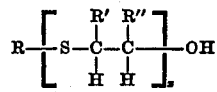

wherein R is a secondary alkyl radical or a secondary aralkyl radical, $x$ is a small whole number between 4 and 50 indicating the extent of polymerization, and R' and R" are the hydrogen, methyl, ethyl, phenyl, vinyl radicals, the higher alkyl radicals, especially those having up to eight carbon atoms, and the substituted phenyl radicals, particularly the methyl phenyl, dimethyl phenyl, and ethyl phenyl radicals. Suitable secondary alkyl radicals (R radicals) are isopropyl, sec-butyl, α-phenylethyl and α-phenylisobutyl.

The invention is defined by the following claims:

1. A polymeric composition having the structural formula:

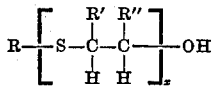

wherein R is a t-alkyl radical, R' and R" are radicals of the group consisting of hydrogen, alkyl radicals having up to eight carbon atoms, phenyl, alkyl substituted phenyl and vinyl radicals, and $x$ is a whole number from four to 50 indicative of the extent of polymerization.

2. A polymeric composition having the structural formula:

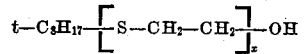

wherein $x$ is a whole number from four to 50 indicative of the extent of polymerization.

3. A method of preparing polysulfides which comprises heating β-t-octylmercaptoethanol in the presence of a strong acid catalyst, removing a substantial amount of water and separating the resulting polymer.

4. A polymeric composition having the structural formula:

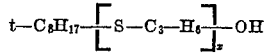

wherein $x$ is a number between four and 50, indicative of the extent of polymerization.

5. A method of preparing polysulfides which comprises heating t-octylmercaptopropanol in the presence of a strong acid catalyst, removing a substantial amount of water and separating the resulting polymer.

6. A polymeric composition having the structural formula:

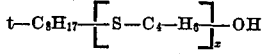

wherein $x$ is a number between four and 50, indicative of the extent of polymerization.

7. A method of preparing polysulfides which comprises heating β-t-octylmercaptobutenol in the presence of a strong acid catalyst, removing a substantial amount of water and separating the resulting polymer.

8. A method of preparing polysulfides, which comprises heating tertiary alkyl mercapto alcohols having the following structural formula:

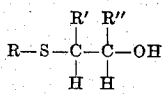

wherein R is a tertiary alkyl radical, R' and R'' are radicals of the group consisting of hydrogen, alkyl radicals having up to eight carbon atoms, phenyl, alkyl substituted phenyl, and vinyl radicals, in the presence of acid catalyst of the group consisting of sulfuric acid, p-toluene sulfonic acid, benzene sulfonic acid, alkane sulfonic acids and phosphoric acid, said heating being conducted under conditions such that a substantial amount of water is evolved from the reaction mixture, and separating the resulting polymer.

JOACHIM DAZZI.

REFERENCES CITED

The following references are of record in the file of this patent:

UNITED STATES PATENTS

| Number | Name | Date |
|---|---|---|
| 2,191,564 | Graenacher | Feb. 27, 1940 |